: 3,392,858
Patented July 16, 1968

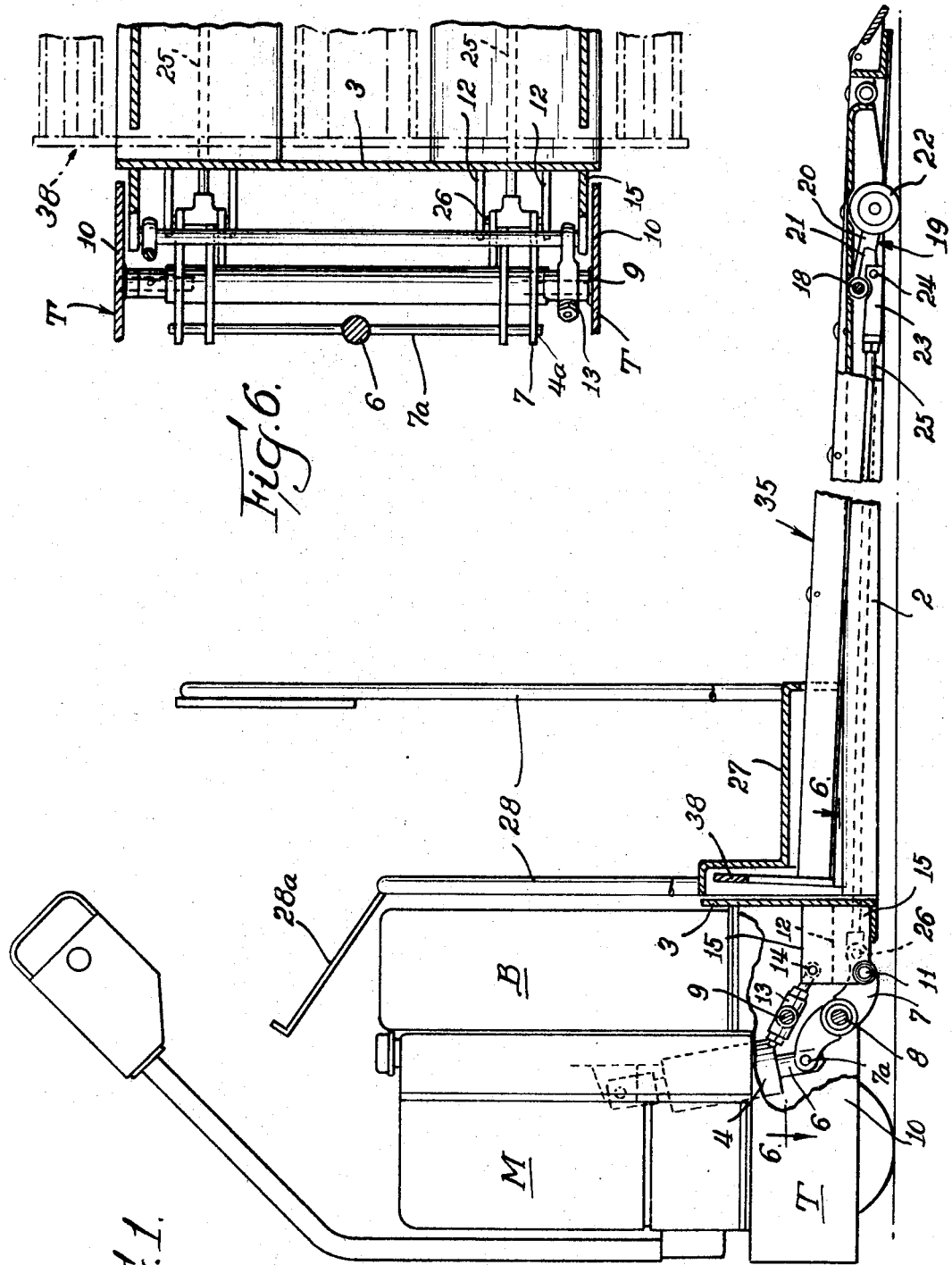

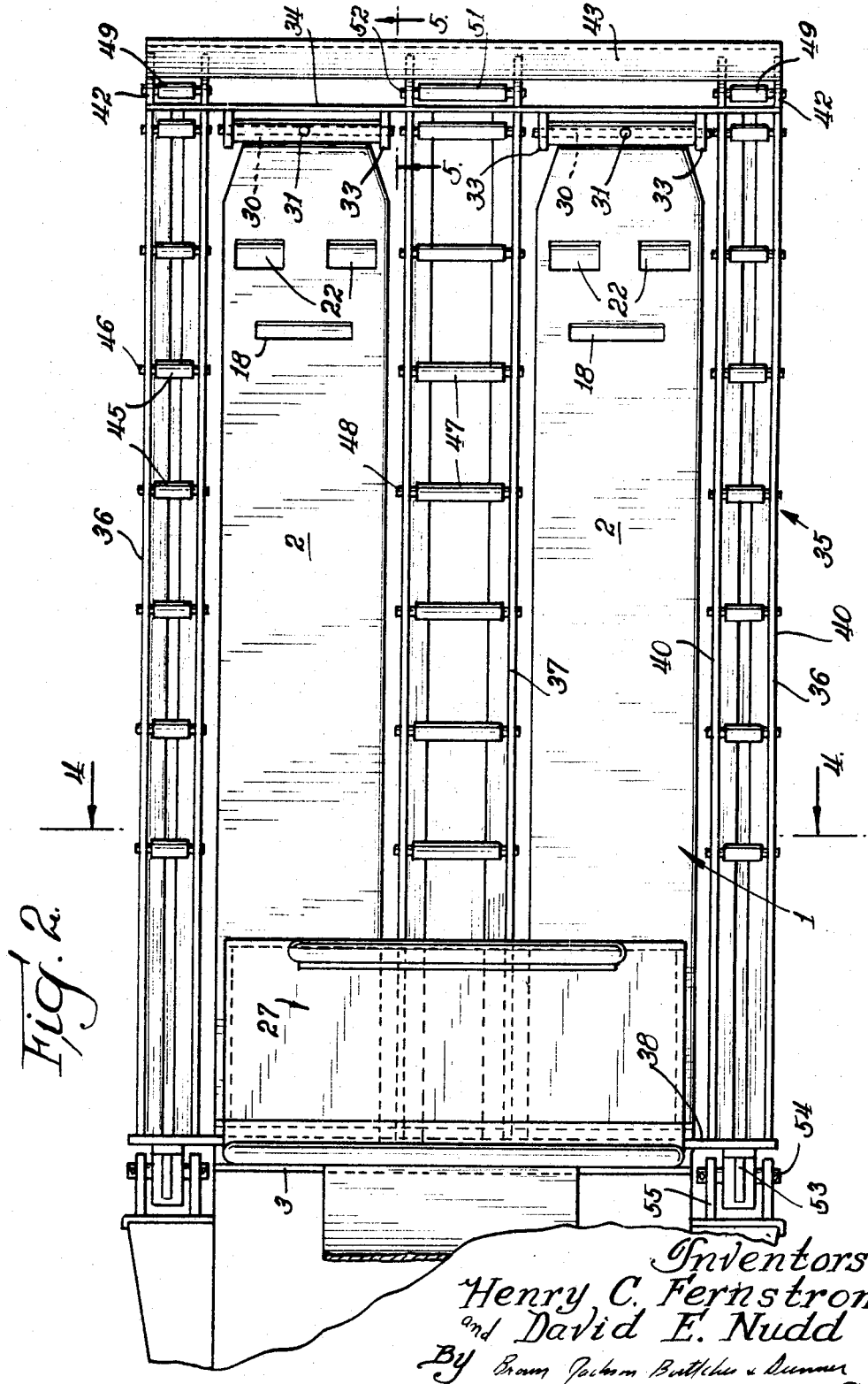

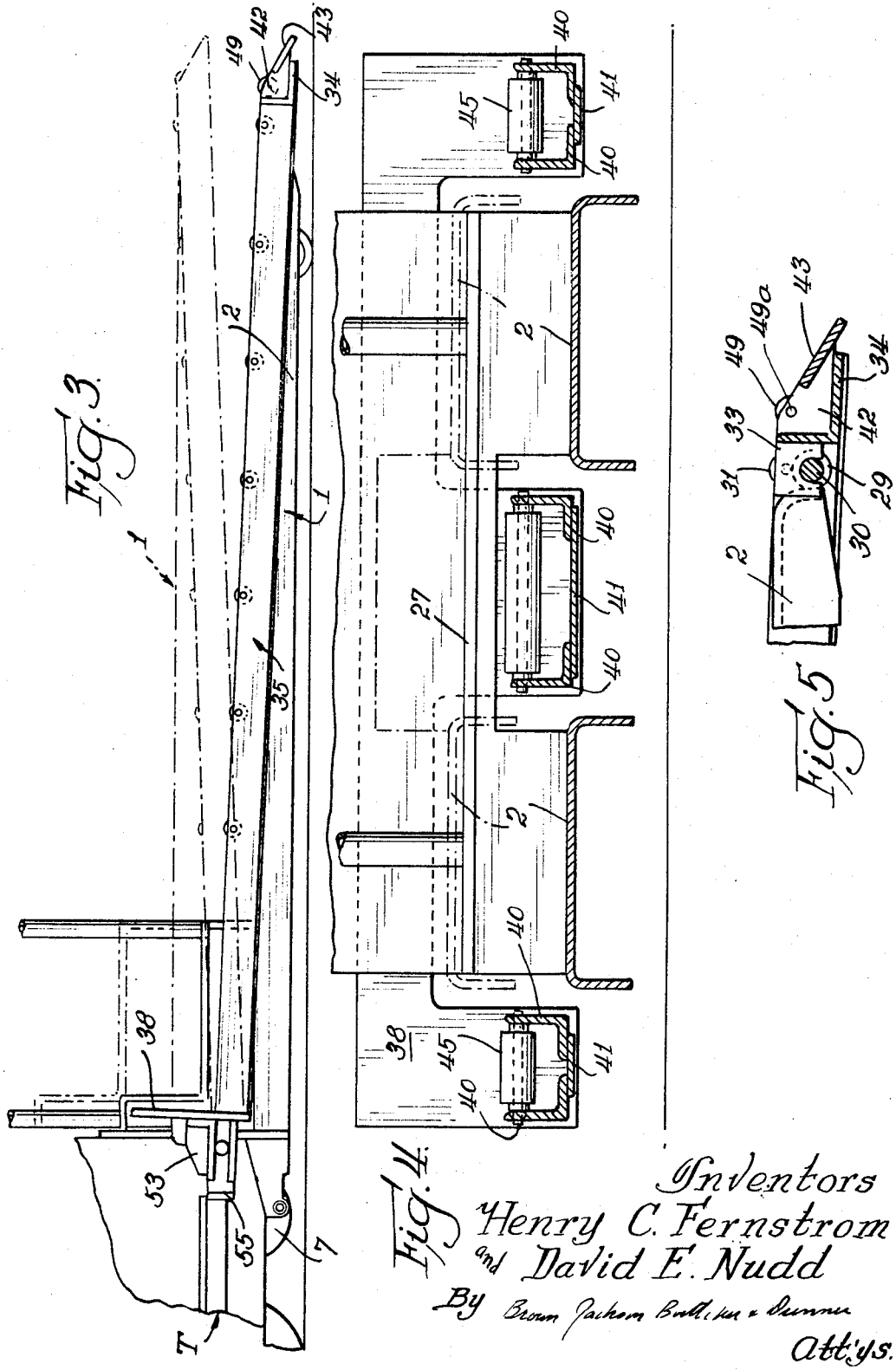

3,392,858
INDUSTRIAL LOADING AND
UNLOADING TRUCK
Henry C. Fernstrom, Northbrook, Ill., and David E.
Nudd, La Crosse, Wis., assignors to Barrett-Cravens
Company, Northbrook, Ill., a corporation of Illinois
Filed Mar. 10, 1966, Ser. No. 533,353
13 Claims. (Cl. 214—512)

ABSTRACT OF THE DISCLOSURE

A material handling truck for use in transporting and discharging loads disposed on plywood sheet pallets, including a wheel supported frame having a pallet supporting and carrying fork and a discharge fork supported thereon. The forks extend rearwardly of the frame in generally parallel relation. The pallet or load supporting and carrying fork is vertically movable between a first position above the discharge fork for supporting and carrying a pallet free from the discharge fork, and a second position below the discharge fork allowing the pallet to rest solely on the discharge fork. The discharge fork supports a plurality of transverse rollers and is supported by the frame and supporting fork for pivotal movement such that when the pallet supporting fork is lowered to its second position, the discharge fork is inclined downwardly and rearwardly thereby allowing a pallet supported on the rollers to be readily removed from the discharge fork.

---

This invention relates to fork trucks and has to do with Lo-Lift pallet trucks for placing loads of packaged merchandise in semitrailers, railway cars and other transport vehicles.

It is known to place unit loads of packaged merchandise upon double faced pallets, usually wooden pallets, and to unload such units by means of pallet lift trucks of known type. The double faced pallets are of appreciable height, approximately five and one-half inches and occupy space in the transportation vehicle which otherwise could be occupied by the merchandise. Also, the wooden pallets are subject to a rather high rate of breakage and other damage, loose nails in such pallets damage the floors of the transportation vehicles and packaged merchandise, and pilferage of the pallets is substantial. In view of the above, the expanse incident to the use of the known double faced wooden pallets is substantial.

Our invention is directed to a pallet Lo-Lift Walkie-Rider electrical truck and associated means whereby the above objections to the known truck and pallet means for handling unit loads are avoided. To that end we provide a Lo-Lift Walkie-Rider electrical pallet truck having a load supporting the carrying fork and a load discharge rack, adapted for use with a unit load mounted upon a sheet of plywood or other suitable material. Preferably, the truck is what is known as a Walkie-Rider Lo-Lift high speed battery operated truck though. In its broader aspects, our subject invention may be applied to a truck of any suitable type. More specifically, the load supporting and carrying fork, when raised, is disposed above the discharge load transfer rack and is movable from an upper position to a lower position in which rollers on the transfer rack support the load, with the transfer rack then inclined downward away from the truck body for ready delivery and placement of the unit load onto the floor of the transportation vehicle.

The advantages of the novel pallet lift truck in its use with a plywood platform, though not obvious, are many. With reference to the food industry, by way of briew example, the warehouse distributor has long been faced with the problem of costs incurred in assembling orders from the warehouse, and loading of the assembled orders on a truck for delivery to the neighborhood grocery store. It will be apparent that each order may consist of many different items which may be stored at widely dispersed locations in the warehouse. For this reason, progressive distributors have determined that substantial savings may be achieved by using pallet-carrying lift trucks which may be quickly moved to the different locations for the purpose of picking up the various items. As a load is completed, the lift truck is driven into the delivery truck, at which point the pallet and load are discharged.

While such mode of operation resulted in substantial cost reduction, other difficulties nevertheless were experienced. For example, the bulkiness of the pallets resulted in a noticeable reduction in the pay load which each delivery truck was able to carry. That is, if a delivery truck previously was capable of carrying the orders for an existing route, with the advent of the pallets the load which a delivery truck was able to carry was materially reduced, and as a result, it was necessary to either add extra delivery trucks, require the same truck to make an added trip, or change the routing of all the trucks to make up for the lost payload capacity of the delivery trucks. According to the present arrangement in which a novel Lo-Lift pallet truck is provided for handling load-carrying plywood sheets, the minimum space which is required for such sheet in the delivery truck permits loading of the delivery truck with substantially the same number of items which were previously carried when hand loading was practiced.

Without detailing the other problems normally encountered in the automation of warehouse loading, another advantage resulting from the use of the new pallet truck with a load transfer attachment is a substantial increase in dock storage space (the fourteen plywood sheets required for one truck load as stacked on end required only fourteen inches in depth on the dock loading platform, whereas pallets previously used in a forty foot truck would require a total of twenty-eight pallets, which when stacked fourteen high, would require two stacks approximately six feet high extending five and a half feet into the dock loading area). Further, when the pallets had to be removed from the stack, dropping of the pallets, which occurs frequently, results in damage to the wooden pallets.

Yet another advantage has been found in the more compact loading achieved with such equipment. That is, as successive loads on plywood sheets are delivered by the pallet truck, the containers or packages on the further loads tend to tilt into position with the merchandise which has been previously loaded in the delivery truck, and practically no waste space, such as is presently experienced with the pallet type units, occurs between the successive loads. A standard pallet is forty inches in width, allowing twelve inches total gap in a ninety-two-inch wide semitrailer. The plywood sheets are forty-three inches in width, gaining six inches in storage and cuts load side shift to a minimum.

These and other objects of the invention will be apparent from the following description and accompanying drawings which serve to illustrate the various exemplary embodiments thereof in which:

FIGURE 1 is a side view of a loading and unloading truck embodying our invention, with certain parts broken away and other parts shown in section;

FIGURE 2 is a top plan view, on a reduced scale, of the truck of FIGURE 1, with parts broken away;

FIGURE 3 is a side view of the forks and adjacent parts, of FIGURE 2, showing in full lines the relative positions of the forks, when the load carrying and supporting fork is in its lowered position and, in broken lines, the relative positions of the forks when the load carrying and supporting fork is in raised position;

FIGURE 4 is a sectional view, on an enlarged scale, taken substantially on line 4—4 of FIGURE 2;

FIGURE 5 is a sectional view, on an enlarged scale taken substantially on line 5—5 of FIGURE 2; and FIGURE 6 is a fragmentary sectional view taken substantially on line 6—6 of FIGURE 1 with certain parts broken away.

The truck of our invention is, in general, of known construction and operation, except as to those features having to do with our invention. It comprises a wheel mounted frame or truck T upon which a load supporting and carrying fork 1 is mounted for vertical movement. The fork 1 is substantially rectangular in plan and comprises two spaced parallel arms 2 of inverted channel cross section and of elongated rectangular or oblong shape in plan. The arms 2 are secured at their forward end portions to a plate 3 disposed adjacent and rearward of a storage battery compartment B. As is shown more clearly in FIGURES 1 and 6, a hydraulic ram 4 is pivotally mounted, at 4a, at its upper end on a bracket 5 of a member fixed to and extending upward from wheel truck T adjacent and in rear of motor compartment M. Piston rod 6 of ram 4 is pivoted, at its lower end, to a cross rod 7a connecting the forwardly extending arms of levers 7 mounted at approximately their midlengths on a cross shaft 8 rockably mounted on reduced studs at the inner ends of stub shafts 9 fixed to rearward side extensions 10 of wheel frame T. The levers 7 are disposed adjacent the sides of frame T and each thereof is pivoted, a short distance from its rearward end, at 11, between a pair of rectangular bracket plates 12 secured to and projecting forwardly from plate 3, a short distance from each side thereof, it being noted that pivot 11 is disposed at the lower forward corners of bracket plates 12. An arm 13 is pivoted on each of the stub shafts 9, adjacent the inner face of extension 10. The rearward end of each arm 13 is pivoted, at 14, to a bracket plate 15 secured to and projecting forwardly from plate 3, adjacent the inner face of extension 10. The axis of pivot 9 is in the same vertical plane as the axis of cross shaft 8 and the axes of the pivots 11 and 14 are also in the same vertical plane. Accordingly, the rearwardly extending arms of the levers 7 and the arms 13 provide parallelograms connected to plate 3 adjacent each side thereof. Hydraulic fluid under appropriate pressure may be supplied to the rams 4 by motor driven pump means, appropriate controls being provided to that end, as is known. The pump and controls may be of any suitable known type and need not be further described. As will be understood, the carrying fork may thus be raised and lowered as desired and during such movements is guided by the parallelograms above mentioned.

Referring to FIGURES 1 and 2, each of the arms 2 is provided, a short distance from its rearward end, with a cross shaft 18 on which is pivoted a fork 19 having a relatively long rearwardly extending arm 20 flanked by a pair of shorter rearwardly extending arms 21. Two load supporting ground engaging rollers 22 are rotatably mounted on arm 20 and a shackle 23 is pivoted at 24 to the arms 21. A pull rod 25 is secured at its rearward end to shackle 23 and is pivoted at its forward end at 26, to the rearward end of the corresponding lever 7. As will be understood from the above, when the fork 1 is moved upward incident to upward movement of plate 3, the fork 19 is swung forward, as viewed in FIGURE 1. That results in forward movement of the rollers 22 effective for raising the rearward portion of fork 1 which is then in raised position in which it is supported by plate 3 and the rollers 22. As the plate 3 is returned to lowered position the rollers 22 are rturned to their rearward position. The arms 2 of the fork 1 are then supported in their lowered position by plate 3 and rollers 22. An operator's platform 27 extends over fork arms 2, as is known, and is provided with back rests 28 and a clip board 28a. The platform 3 is suitably formed to clear the arms of a load delivery fork referred to more fully presently.

Each of the arms 2 of fork 1 is provided, at its rearward end, with a sleeve 29 welded thereto in which is secured a horizontal rod 30 by a set screw 31. The ends of rod 30 extend into downwardly opening slots in brackets 33 welded or otherwise suitably secured to an angle iron strip 34 extending transversely of and welded or otherwise suitably secured to the rearward ends of the arms of a load delivery rack or fork 35, to be described more fully presently. The ends of rods 30 have a loose fit in brackets 33 and provide therewith means for raising and lowering the rearward end portion of the load delivery or discharge fork 35 incident to raising and lowering of fork 1, with lost motion therebetween.

Fork 35 comprises three arms, two side arms 36 and a central arm 37, the arms 36 being disposed at the outer sides of arms 2 of fork 1 in spaced relation thereto and arm 37 being disposed between and spaced from the arms 2. The arms 36 and 27 are of elongated rectangular or oblong shape in plan and are secured at their forward ends to a cross plate or bar 38 underlying the flanged forward wall of a platform 27 suitably mounted on the frame T. Arms 36 and 37 are of similar construction, the latter being appreciably wider than the former, and a description of the construction of one thereof will suffice. Referring to FIGURES 2 and 4, each of the arms 36 and 37 comprises spaced parallel angle iron side rails 40 secured together by suitably spaced cross brace strips 41 underlying and secured to the base flanges of the angle rails 40. The previously mentioned angle iron strip 34 extends the full width of fork 35 and is welded or otherwise suitably secured to the rearward ends of the side rails 40 of the arms 36 and 37. Gusset plates 42 are welded to the flanges of the cross angle strip 34, such plates 42 being arranged in pairs with those of each pair aligned with the side angle rails of the arms 36 and 37, respectively, of the load delivery or unloading fork 35. The upper rearward edges of the gusset plates 42 are inclined downwardly and rearwardly and have secured thereon, by welding or other suitable means, a downwardly and rearwardly inclined discharge plate 43 which extends the full width of the load delivery or discharge fork 35.

Each of the arms 36 of the discharge or delivery fork 35 is provided with a plurality of transverse rollers 45 mounted therein by pivot pins 46 extending through the vertical flanges of the angle rails 40, such rollers 45 extending above the angle rails a short distance and being provided with end shoulders of reduced diameter restraining them against objectionable looseness or play. Similarly, the arm 37 of fork 35 is provided with a plurality of equally spaced rollers 47 mounted on pivot pins 48 and extending a short distance above the angle side rails 40. The rearmost one of the equally spaced rollers 45 and 47 of the arms 36 and 37, respectively, is disposed in front of and in proximity to the vertical flange of angle strip 34. A roller 49 is mounted, on a pivot pin 49a, between each pair of gusset plates 42 aligned with the rails 40 of arms 36, and a roller 51 is mounted between the pair of gusset plates 42 aligned with the side rails 40 of arm 37, on a pivot pin 52. The pairs of rollers 45 and 49, and 47 and 51, are disposed adjacent and at opposite sides of the vertical arm or flange of angle strip 34 and project a short distance thereabove.

An extension arm 53 is suitably secured, by welding or in any suitable manner, to the sides or ends of the plate 38 and extends therefrom forwardly along the sides of the truck or wheel frame T. Each of the extension arms 53 is pivoted, by a horizontal pivot pin 54 to a bracket 55 secured to a lateral extension of the wheel or truck frame T. The pins 54 are coaxial, as will be understood, and the delivery or discharge fork is pivotally connected to the frame T at opposite sides thereof for movement about the comomn axis of pins 54.

In the use of truck, the load supporting and carrying fork 1 is moved from its full line position shown in FIGURE 3 to its upper position indicated in broken lines. During such upward movement of the fork 1, the fork 35 is swung about the common axis of the pivot pins 54 to its broken line position indicated. The rollers 45 and 47 of the arms 36 and 37 of the load delivering or discharge fork 35 are then disposed below the upper surfaces of the arms 2 of the fork 1, the top walls of which then provide flat surfaces of substantial width aligned transversely of the forks. A sheet of plywood or other suitable material, of appropriate thickness and width and length, is then placed upon the arms 2 of fork 1 with the rearward end of such strip spaced from the rearmost rollers 45 and 47 of the arms 36 and 37 of the load discharge or delivering fork 35, it being noted that when the fork 1 is in its raised position the rollers just referred to project a slight distance above the fork 1. The sheet of plywood preferably is provided with openings of appreciable size, to discourage pilferage. With the strip of plywood properly positioned upon fork 1, the cartons or other containers of the packaged goods are stacked upon the sheet in an interlocking pattern, as is known. The loaded truck is then moved into a railway car, trailer truck or other suitable conveyance and is properly positioned therein for discharge or delivery of the unit load. Assuming that a previous unit load has been deposited in the trailer truck, for example, the loading and unloading truck is positioned so that the discharge plate 43 is in proximity to the previously discharged load and the fork 1 is moved to its lowered position shown in full lines in FIGURE 3. The arms of fork 1 then pass downward between the arms of fork 35, the latter being then inclined downwardly and rearwardly away from the body of the loading and delivering truck, as shown in full lines in FIGURE 3. The unit load then rests upon the rollers of fork 35 and may readily be rolled off of the fork 35 into position in contact with the previously deposited unit load. During such discharge of the unit from the truck the latter is moved in forward direction so as to withdraw the forks 1 and 35 from beneath the unit load, the latter passing off of the rollers 45 and 49, and 47 and 51, and downwardly over the plate 43 as withdrawal of the forks is completed. When the fork 1 is in its raised position the rearward end thereof is supported by the rollers 22, and the rearward end of fork 35 is supported by the rods 30 in cooperation with the brackets 33 and angle strip 34. In the lowered position of fork 1 the rearward end of fork 2 and the load thereon are similarly supported. When the truck is used for unloading, the unit load is rolled onto fork 35, with fork 1 in lowered position, fork 1 is raised, the loaded truck is moved to the point of delivery and the unit load is there discharged as above described.

Referring further to FIGURE 3, the extension arms 53 preferably are slotted and open at their forward ends, as shown. This enables ready removal of the fork 35, for replacement or repairs, or for use of the truck without fork 35, as may be desired or necessary. Such removal of fork 35 may be readily effected by raising the rearward end thereof sufficiently to disengage the brackets 33 from the rods 30, with fork 1 then in raised position, and moving fork 35 rearward until the extension arms 53 pass off of the pivot pins 54.

As above indicated, changes in detail may be resorted to without departing from the field and scope of our invention, and we intend to include all such variations, as fall within the scope of the appended claims, in this application in which the preferred form only of our invention has been disclosed.

We claim:

1. In a truck of the character described, a wheel mounted front frame, a first load supporting and carrying fork mounted on said frame for vertical adjustment, said fork comprising spacer arms extending rearwardly from said frame, a second discharge fork mounted on said frame and comprising rearwardly extending spaced arms disposed in substantially spaced parallel relation to said arms of said first fork, the latter having an upper position with said arms thereof disposed above the arms of said second fork and a lower position with said arms of said first fork disposed below said arms of said second fork, means mounting said arms of said second fork for movement to a downwardly and rearwardly inclined position upon movement of said first fork to said lower position, and means for moving said first fork to its said upper and lower positions.

2. In a truck of the character described, a wheel mounted front frame, a first load supporting and carrying fork mounted on said frame for vertical adjustment, said fork comprising spaced arms extending rearwardly from said frame, a second discharge fork mounted on said frame and comprising rearwardly extending spaced arms disposed in substantially spaced parallel relation to said arms of said first fork and provided at their upper surfaces with antifriction means, said second fork being connected adjacent its forward end to said frame for movement about a substantially horizontal axis, said first fork having an upper position with said arms thereof disposed above said antifriction means and a lower position with said arms thereof disposed below said antifriction means, means for moving said first fork to its said upper and lower positions, means effective for supporting the rearward end of said first fork in both of its said positions, and lost motion connections between said forks effective for supporting the rearward end of said second fork.

3. In a truck of the character described, a wheel mounted front frame, a first load supporting and carrying fork mounted on said frame for vertical adjustment, said fork comprising spaced arms extending rearwardly from said frame, a second discharge fork mounted on said frame and comprising rearwardly extending spaced arms disposed in substantially spaced parallel relation to said arms of said first fork and provided at their upper surfaces with antifriction means, said second fork being connected adjacent its forward end to said frame for movement about a substantially horizontal axis, said first fork having an upper position with said arms thereof disposed above said antifriction means and a lower position with said arms thereof disposed below said antifriction means, means for moving said first fork to its said upper and lower positions, means effective for supporting the rearward ends of said first fork in both of its said positions, and lost motion connections between the rearward ends of said forks effective for supporting the rearward end of said second fork.

4. A truck substantially as defined in claim 3 and in which said lost motion connections between the rearward endse of said forks comprise rods mounted on said first fork and brackets fixed to said second fork and engaging over said rods.

5. A truck substantially as defined in claim 4 and in which downwardly opening brackets fixed to the rearward end of said second fork engage loosely over rods fixed to the rearward end of said first fork.

6. A truck substantially as defined in claim 2 and in which the arms of the respective forks are of substantially elongated rectangular shape in plan and the arms of said second fork have transversely extending antifriction rollers mounted thereon and extending thereabove.

7. A truck substantially as defined in claim 6 and in which said second fork is pivotally mounted on said wheel mounted frame for movement relative thereto about a horizontal axis.

8. A truck substantially as defined in claim 6 and in which the arms of said first fork are of substantially inverted channel cross section with substantially flat top walls and the arms of said second fork comprise spaced angle side rails with the rollers mounted between and extending above said rails.

9. A truck substantially as defined in claim 1 and in which said first fork is fixed to a plate vertically adjustable on said wheel mounted front frame by means carried by the latter.

10. In a truck of the character described, a wheel mounted front frame, a plate vertically adjustable on said wheel mounted front frame by means carried by the latter, a first load supporting and carrying fork fixed to said plate for vertical adjustment therewith, said fork comprising spaced arms extending rearwardly from said frame, a second discharge fork pivotally mounted on said frame for movement about a horizontal axis and comprising rearwardly extending spaced arms disposed in substantially spaced parallel relation to said arms of said first fork, the latter having an upper position with said arms thereof disposed above the arms of said second fork and a lower position with said arms of said first fork disposed below said arms of said second fork, and means for moving said first fork to its said upper and lower positions.

11. A truck substantially as defined in claim 10 and in which the pivot axis of said second fork is disposed forwardly of said plate.

12. A truck substantially as defined in claim 10 and in which the pivot axis of said second fork is disposed below and forwardly of said plate.

13. A truck substantially as defined in claim 5 and in which said second fork is pivoted on said wheel mounted front frame by forwardly projecting extension arms having lengthwise slots open at their forward ends and pivot pins mounted on said frame and passing through said slots.

References Cited
UNITED STATES PATENTS

| | | | |
|---|---|---|---|
| 2,432,182 | 12/1947 | Turner | 214—512 XR |
| 2,643,740 | 6/1953 | Quayle | 280—43.12 |
| 2,992,751 | 7/1961 | Quayle | 214—514 XR |

ALBERT J. MAKAY, *Primary Examiner.*